(12) United States Patent

Ozsoylu et al.

(10) Patent No.: US 12,570,260 B2
(45) Date of Patent: Mar. 10, 2026

(54) BRAKE SYSTEM WITH FAULT-TOLERANT FEATURES

(71) Applicant: ZF Active Safety US Inc., Livonia, MI (US)

(72) Inventors: Suat Ozsoylu, Rochester Hills, MI (US); Blaise J. Ganzel, Ann Arbor, MI (US)

(73) Assignee: ZF Active Safety US Inc., Livonia, MI (US)

( * ) Notice: Subject to any disclaimer, the term of this patent is extended or adjusted under 35 U.S.C. 154(b) by 555 days.

(21) Appl. No.: 18/076,450

(22) Filed: Dec. 7, 2022

(65) Prior Publication Data

US 2024/0190406 A1      Jun. 13, 2024

(51) Int. Cl.
B60T 8/94          (2006.01)
B60T 7/04          (2006.01)
(Continued)

(52) U.S. Cl.
CPC ................ B60T 8/94 (2013.01); B60T 7/042 (2013.01); B60T 13/142 (2013.01);
(Continued)

(58) Field of Classification Search
CPC .......... B60T 7/042; B60T 8/94; B60T 8/4081; B60T 8/175; B60T 8/176; B60T 8/885; B60T 8/3615; B60T 8/4827; B60T 8/4845; B60T 13/58; B60T 13/142; B60T 13/148; B60T 13/686; B60T 13/745;
(Continued)

(56) References Cited

U.S. PATENT DOCUMENTS

2013/0127237 A1 *   5/2013   Pfeiffer ................. B60T 8/4018
                                                             303/6.01
2013/0291533 A1 *  11/2013   Inoue .................... B60T 17/088
                                                             60/545

(Continued)

FOREIGN PATENT DOCUMENTS

DE       102018212852 A1 *   2/2020   ................ B60T 8/92

OTHER PUBLICATIONS

English machined translation of DE—102018212852, Feb. 6, 2020.*

*Primary Examiner* — Robert A. Siconolfi
*Assistant Examiner* — San M Aung
(74) *Attorney, Agent, or Firm* — Brooks Kushman P.C.

(57)          ABSTRACT

A brake system includes a reservoir and a motor-driven master cylinder operable during a backup braking mode by actuation of an electric motor of the master cylinder to generate brake actuating pressure at first and second MC outputs. A power transmission unit provides pressurized hydraulic fluid to a PTU output for actuating first and second pairs of wheel brakes in a normal non-failure braking mode. The power transmission unit includes a side-mounted electric PTU motor configured to selectively pressurize the hydraulic fluid by transmitting rotary motion to a ball nut assembly of the power transmission unit via a force translator mechanically interposed between the electric PTU motor and the ball nut assembly. First and second two-position three-way valves each selectively control hydraulic fluid flow from a chosen one of the master cylinder and the power transmission unit to a corresponding pair of wheel brakes.

18 Claims, 1 Drawing Sheet

(51) Int. Cl.

| | |
|---|---|
| *B60T 11/20* | (2006.01) |
| *B60T 13/14* | (2006.01) |
| *B60T 13/58* | (2006.01) |
| *B60T 13/68* | (2006.01) |
| *B60T 13/74* | (2006.01) |

(52) U.S. Cl.
CPC ............ *B60T 13/148* (2013.01); *B60T 13/58* (2013.01); *B60T 13/686* (2013.01); *B60T 13/745* (2013.01); *B60T 11/20* (2013.01); *B60T 2220/04* (2013.01); *B60T 2270/402* (2013.01); *B60T 2270/404* (2013.01); *B60T 2270/413* (2013.01); *B60T 2270/82* (2013.01)

(58) Field of Classification Search
CPC ...... B60T 13/146; B60T 13/662; B60T 11/20; B60T 2220/04; B60T 2270/402; B60T 2270/404; B60T 2270/413; B60T 2270/10; B60T 2270/82; B60T 2270/88; B60T 2270/203; B60T 2270/304; B60T 2270/306; B60T 15/028; B60T 17/22

USPC ....................................... 303/6.01, 113.4, 10
See application file for complete search history.

(56) References Cited

U.S. PATENT DOCUMENTS

| | | | |
|---|---|---|---|
| 2015/0028664 A1* | 1/2015 | Choi ..................... | B60T 13/745 303/3 |
| 2016/0082940 A1* | 3/2016 | Cagnac ................. | B60T 13/745 303/15 |
| 2018/0194337 A1* | 7/2018 | Leiber ..................... | B60T 13/58 |
| 2019/0092304 A1* | 3/2019 | Ganzel .................. | B60T 13/686 |
| 2019/0100179 A1 | 4/2019 | Lee | |
| 2019/0135256 A1 | 5/2019 | Lee | |
| 2019/0225205 A1* | 7/2019 | Ganzel .................. | B60T 13/745 |
| 2019/0248348 A1* | 8/2019 | Ganzel .................. | B60T 13/745 |
| 2019/0275997 A1* | 9/2019 | Park ........................ | B60T 13/18 |
| 2020/0130667 A1* | 4/2020 | Bull ........................ | B60T 7/042 |
| 2020/0298807 A1* | 9/2020 | Ganzel .................. | B60T 13/146 |
| 2021/0291665 A1* | 9/2021 | Liu ......................... | B60T 8/171 |

\* cited by examiner

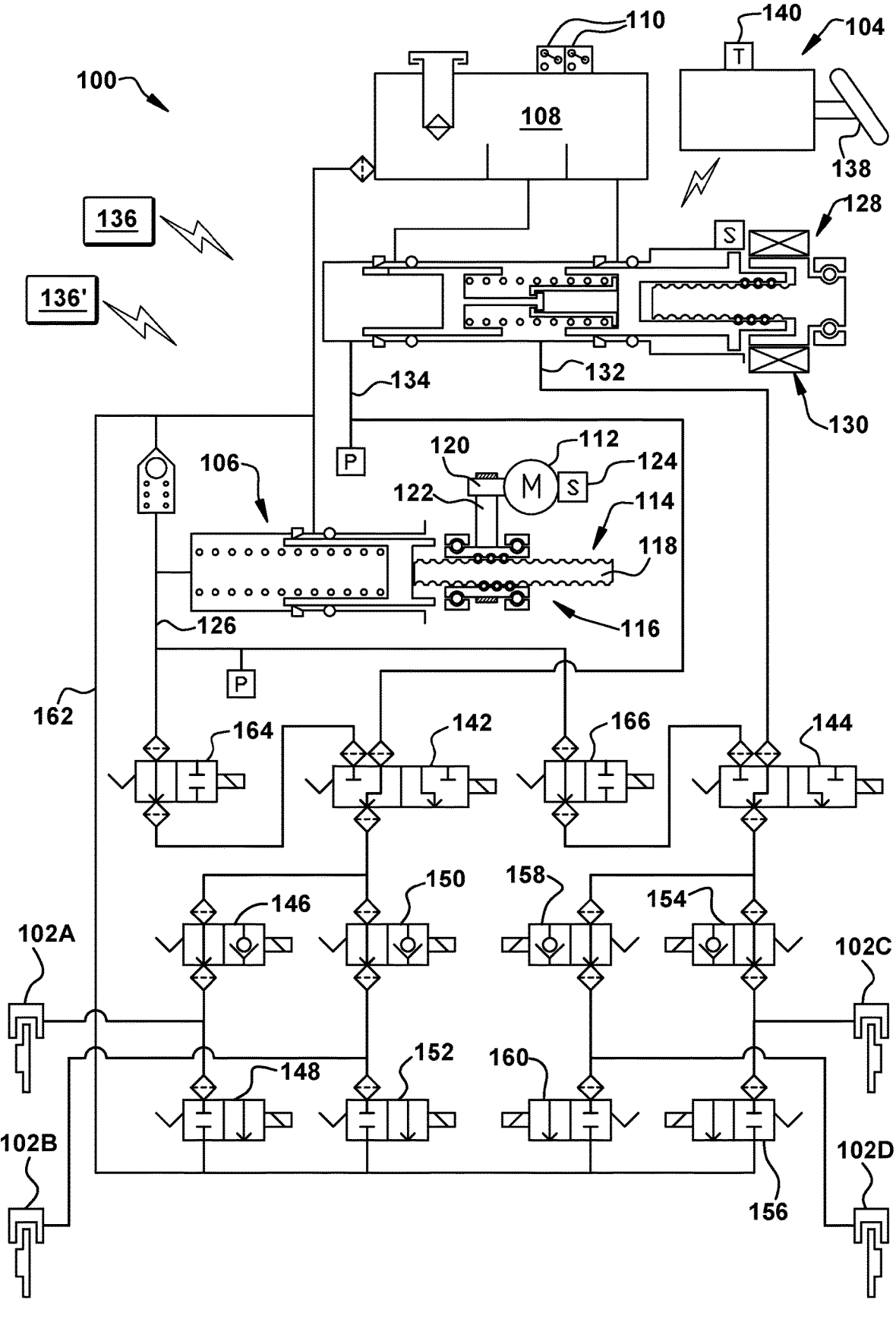

BRAKE SYSTEM WITH FAULT-TOLERANT FEATURES

TECHNICAL FIELD

This disclosure relates to an apparatus and method for use of a brake system and, more particularly, to a method and apparatus of a brake system with fault-tolerant features.

BACKGROUND

This invention relates in general to vehicle braking systems. Vehicles are commonly slowed and stopped with hydraulic brake systems. These systems vary in complexity but a base brake system typically includes a brake pedal, a master cylinder, fluid conduits, which can be arranged in two similar but separate brake circuits, and wheel brakes in each circuit. The driver of the vehicle operates a brake pedal which is directly or indirectly connected to the master cylinder. When the brake pedal is depressed, the master cylinder generates hydraulic forces in both brake circuits by pressurizing brake fluid. The pressurized fluid travels through the fluid conduit in both circuits to actuate brake cylinders at the wheels to slow the vehicle.

Base brake systems typically use a brake booster which provides a force to the master cylinder which assists the pedal force created by the driver. The booster can be vacuum or hydraulically operated. A typical hydraulic booster senses the movement of the brake pedal and generates pressurized fluid which is introduced into the master cylinder. The fluid from the booster assists the pedal force acting on the pistons of the master cylinder which generate pressurized fluid in the conduit in fluid communication with the wheel brakes. Thus, the pressures generated by the master cylinder are increased. Hydraulic boosters are commonly located adjacent the master cylinder piston and use a boost valve to control the pressurized fluid applied to the booster.

During initial movement of the brake pedal unit in boosted mode, the driver pushes on the brake pedal, causing initial movement of an input piston of the master cylinder. Further movement of the input piston will pressurize the input chamber of the master cylinder, causing fluid to flow into a pedal simulator. As fluid is diverted into the pedal simulator, a simulation pressure chamber within the pedal simulator will expand, causing movement of a piston within the pedal simulator. Movement of the piston compresses a spring assembly housed within the pedal simulator and biasing the piston to provide a feedback force to the driver of the vehicle via the brake pedal which simulates the forces a driver feels at the brake pedal in a conventional vacuum assist hydraulic brake system, for example, and therefore is an expected and comforting "brake feel" for the driver.

When the vehicle is first started, the brake fluid is under little to no pressure. In certain cases, the driver manually applies the brake in a "push-through" condition, in which the master cylinder directly energizes pressure to at least two, and often four, of the wheel brakes. As the brake system comes online and pressure builds, the system transitions to a "boost" mode wherein the booster is used to supplement or supplant pressurized fluid sent to the wheel brakes from the driver's push-through force on the brake pedal. However, this is not always a smooth transition and can result in a "pedal drop" condition when the pedal simulator is pressurized that can be discomfiting to the driver.

Descriptions of prior art brake systems are in U.S. Pat. No. 10,730,501, issued 4 Aug. 1020 to Blaise Ganzel and titled "Vehicle Brake System with Auxiliary Pressure Source", and in U.S. Patent Application Publication No. 1020/0307538, published 1 Oct. 1020 by Blaise Ganzel and titled "Brake System with Multiple Pressure Sources", in U.S. Patent Application Publication No. 1022/0274575, published 1 Sep. 1021 by Blaise Ganzel and titled "Hydraulic Brake Boost", and in U.S. patent application Ser. No. 17/708,070, filed 30 Mar. 1022 by Blaise Ganzel and titled "Tandem Power Transmission Unit and Brake Systems Using Same" (hereafter referenced as "the '070 application"), all of which are incorporated herein by reference in their entirety for all purposes.

SUMMARY

In an aspect, alone or in combination with any other aspect, a brake system for actuating first and second pairs of wheel brakes is provided. The brake system comprises a reservoir and a motor-driven master cylinder operable during a backup braking mode by actuation of an electric motor of the master cylinder to generate brake actuating pressure at first and second MC outputs for hydraulically actuating the first and second pairs of wheel brakes, respectively. A power transmission unit is configured for selectively providing pressurized hydraulic fluid to a PTU output for actuating the first and second pairs of wheel brakes in a normal non-failure braking mode. The power transmission unit includes a side-mounted electric PTU motor configured to selectively pressurize the hydraulic fluid by transmitting rotary motion to a ball nut assembly of the power transmission unit via a force translator mechanically interposed between the electric PTU motor and the ball nut assembly. An electronic control unit is provided for controlling the power transmission unit and the master cylinder. First and second two-position three-way valves are each hydraulically connected with the master cylinder, the power transmission unit, and a selected pair of the first and second pairs of wheel brakes. Each of the first and second three-way valves selectively controls hydraulic fluid flow from a chosen one of the master cylinder and the power transmission unit to the selected pair of wheel brakes.

BRIEF DESCRIPTION OF THE DRAWING

For a better understanding, reference may be made to the accompanying drawing, in which:

FIG. 1 is a schematic hydraulic diagram of a brake system.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

FIG. 1 schematically depicts a brake system 100. The brake system 100 is a hydraulic boost braking system in which boosted fluid pressure is utilized to apply braking forces for the brake system 100. The brake system 100 may suitably be used on a ground vehicle, such as an automotive vehicle having four wheels with a wheel brake associated with each wheel. Furthermore, the brake system 100 can be provided with other braking functions such as anti-lock braking (ABS) and other slip control features to effectively brake the vehicle. Components of the brake system 100 may be housed in one or more blocks or housings. The block or housing may be made from solid material, such as aluminum, that has been drilled, machined, or otherwise formed to house the various components. Fluid conduits may also be formed in the block or housing The brake system 100 includes a plurality of wheel brakes 102 comprising first and second pairs of wheel brakes 102. In the illustrated embodiment of the brake system 100, there are four wheel brakes 102 depicted, by way of example. The wheel brakes 102 can have any suitable wheel brake structure operated by the application of pressurized brake fluid. Each of the wheel brakes 102 may include, for example, a brake caliper mounted on the vehicle to engage a frictional element (such as a brake disc) that rotates with a vehicle wheel to effect braking of the associated vehicle wheel. The wheel brakes 102 can be associated with any combination of front and rear wheels of the vehicle in which the brake system 100 is installed. For example, the brake system 100 may be configured such that a master cylinder primary pressure circuit is associated with providing fluid to a first pair of wheel brakes 102A and 102B, and a master cylinder secondary pressure circuit is associated with providing fluid to a second pair of wheel brakes 102C and 102D. In some use environments, the first and second pairs of wheel brakes 102 may be front and rear pairs of wheel brakes 102. In other use environments, each of the first and second pairs of wheel brakes 102 may includes a front wheel brake 102 from a selected lateral (left/right) side of the vehicle and a rear wheel brake 102 from an opposite lateral (right/left) side of the vehicle. One of ordinary skill in the art will be able to readily configure a plurality of wheel brakes 102 as desired for a particular use environment.

The brake system 100 generally includes a brake pedal unit, indicated generally at 104, a power transmission unit 106, and a fluid reservoir 108. The reservoir 108 stores and holds hydraulic fluid for the brake system 100. The fluid within the reservoir 108 is preferably held at or about atmospheric pressure, but the fluid may be stored at other pressures if desired. The reservoir 108 is shown schematically having three tanks or sections with three fluid conduit lines connected thereto. The sections can be separated by several interior walls within the reservoir 108 and are provided to prevent complete drainage of the reservoir 108 in case one of the sections is depleted due to a leakage via one of the three lines connected to the reservoir 108. Alternatively, the reservoir 108 may include multiple separate housings. The reservoir 108 may include at least one fluid level sensor 110 (two shown, for redundancy) for detecting the fluid level of one or more of the sections of the reservoir 108.

The power transmission unit 106 of the brake system 100 functions as a source of pressure to provide a desired pressure level to the wheel brakes 102 during a typical or normal brake apply. After a brake apply, fluid from the wheel brakes 102 may be returned to the power transmission unit 106 and/or diverted to the reservoir 108. In the depicted embodiment, the power transmission unit 106 includes a side-mounted electric PTU motor 112 configured to selectively pressurize the hydraulic fluid by transmitting rotary motion to a ball nut assembly 114 of the power transmission unit 106 via a force translator (shown and discussed herein as belt drive assembly 116) mechanically interposed between the electric PTU motor 112 and the ball nut assembly 114. The term "side-mounted" is used herein to indicate that the electric PTU motor 112 produces rotary motion along a line which is not coaxial or overlapping with a ball screw 118 of the ball nut assembly 114. Instead, as shown here, a shaft 120 of the electric PTU motor 112 extends substantially parallel to the ball screw 118, and a belt 122 of the belt drive assembly 116 transmits rotary motion from the shaft 120, in a pulley-type fashion, to the ball screw 118. The belt drive assembly 114 could be of a toothed or otherwise "indexed" type to avoid slippage during use of the system. It is contemplated that the force translator could also or instead include at least one of a gear drive, a chain drive, or any other mechanism configured to transfer the rotary motion from the electric PTU motor 112 to the ball nut assembly 114 from a remote motion-generation location.

A sensor 124 can be provided to assist with determining a rotational status (direction, magnitude, speed, or any other quality) of the electric PTU motor 112, for use in calculations and/or control by any other component(s) of the brake system 100 as desired.

The power transmission unit 106 selectively provides pressurized hydraulic fluid to a PTU output 220 for actuating the first and second pairs of wheel brakes 102 in a normal non-failure braking mode. In the brake system 100 of FIG. 1, the brake system 100 includes a motor-driven master cylinder 128 operable during a backup braking mode by actuation of an electric MC motor 130 of the master cylinder 128 to generate brake actuating pressure at first and second MC outputs 132 and 134 for hydraulically actuating the first and second pairs of wheel brakes 102, respectively. The master cylinder 128 may be a tandem type master cylinder. It should be noted that the master cylinder 128 depicted in FIG. 1 has a simultaneous cut-off design. The simultaneous cut-off design has less lost travel, but the pedal feel is less desirable for the driver in many use environments. Since the brake system 100 of FIG. 1 is of a brake-by-wire type, the master cylinder 128 is not directly connected to a brake pedal, so the pedal feel makes no difference in this case.

It is also contemplated that the master cylinder 128 could provide pressurized hydraulic fluid during some or all of the normal non-failure "boosted brake applications in particular use environments, and then the power transmission unit 106 could be used during some or all of the slip control events for those use environments. In such case, it may be possible for at least one of the master cylinder 128 and the power transmission unit 106 to employ less robust, but also less expensive, common ball nut assemblies with the respective motors for those pressurized fluid sources. This could also be a way to avoid severe usage motor over-heating with less expensive motors.

The brake system 100 also includes at least one electronic control unit or ECU 136. The ECU 136 may include microprocessors and other electrical circuitry. The ECU 136 receives various signals, processes signals, and controls the operation of various electrical components of the brake system 100 in response to the received signals. The ECU 136 can be connected to various sensors such as the reservoir fluid level sensor 110, pressure sensors, travel sensors, switches, wheel speed sensors, and steering angle sensors. The ECU 136 may also be connected to an external module (not shown) for receiving information related to yaw rate, lateral acceleration, longitudinal acceleration of the vehicle, or other characteristics of vehicle operation for any reason, such as, but not limited to, controlling the brake system 100 during vehicle braking, stability operation, or other modes of operation. Additionally, the ECU 136 may be connected to the instrument cluster for collecting and supplying information related to warning indicators such as an ABS warning light, a brake fluid level warning light, and a traction control/vehicle stability control indicator light.

In the arrangement of the brake system 100 shown in FIG. 1, a brake pedal unit 104 is remotely located from other structures of the brake system 100, to provide a "brake by wire" configuration. Here, the brake pedal unit 104 is of a deceleration signal transmitter type, which provides the braking signal to at least one ECU 136 in a wired or wireless manner exclusively. No manual push-through function is contemplated by the brake system 100 shown in FIG. 1 and described herein. It is also contemplated that the brake pedal unit 104 and related structures may simply be a manually controlled brake arrangement using hand controls or another non-pedal input or may be entirely omitted from the brake system 100, as desired, for a truly autonomous brake arrangement.

The brake pedal unit 104 may include a brake pedal 138 which is selectively actuated by a driver of the vehicle to indicate a desired braking command. The brake pedal unit 104 has at least one brake sensor 140 for determining a position of the brake pedal 138 and responsively producing a braking signal corresponding to the desired braking command. The braking signal is transmitted, wired or wirelessly to at least one ECU 136. The ECU(s) 136 control at least one of the power transmission unit 106 and the master cylinder 128 responsive to the braking signal, to provide pressurized hydraulic fluid to the wheel brakes 102 in either a normal non-failure or backup braking mode. More specifically the ECU(s) 136 control at least one of the electric PTU motor 112 and the electric MC motor 130 responsive to the braking signal, to selectively provide pressurized hydraulic fluid to the wheel brakes 102 in either a normal non-failure or backup braking mode.

In order to switch between the backup braking mode and the normal non-failure braking mode, first and second two-position three-way valves 142 and 144 are provided. Each three-way valve 142 and 144 is hydraulically connected with the master cylinder 128, the power transmission unit 106, and at least two of the wheel brakes 102. For example, each three-way valve 142 and 144 could be hydraulically connected with a selected pair of the front and rear wheel brakes 102. In any event, one of ordinary skill in the art can readily provide a brake system 100, according to the teachings herein, in which each of the first and second three-way valves 142 and 144 selectively controls hydraulic fluid flow from a chosen one of the master cylinder 128 and the power transmission unit 106 to the at least two wheel brakes 102 (A.K.A., an associated pair of wheel brakes 102).

The first and second three-way valves 142 and 144 are designed to facilitate robust and redundant routing of hydraulic fluid to the wheel brakes 102 from one or both of the power transmission unit 106 and the master cylinder 128 under predetermined use circumstances. Accordingly, concurrent disabling of (1) backup braking mode with pressurized hydraulic fluid from the master cylinder 128, and (2) normal non-failure braking mode with pressurized hydraulic fluid from the power transmission unit 106 can only be achieved responsive to failure of two or more components of the brake system 100, which will be quite rare, in most use environments.

The brake system 100 further includes various solenoid-actuated valves ("slip control valve arrangement") for permitting controlled braking operations, such as, but not limited to, ABS, traction control, vehicle stability control, dynamic rear proportioning, regenerative braking blending, and autonomous braking. A first set of valves includes a first apply valve 146 and a first dump valve 148 for cooperatively supplying fluid received from the first three-way valve 142 to the right rear wheel brake 102A, and for cooperatively relieving pressurized fluid from the right rear wheel brake 102A to a reservoir conduit 162 in fluid communication with the reservoir 108. A second set of valves includes a second apply valve 150 and a second dump valve 152 for cooperatively supplying fluid received from the first three-way valve 142 to the left front wheel brake 102B, and for cooperatively relieving pressurized fluid from the left front wheel brake 102B to the reservoir conduit 150. A third set of valves includes a third apply valve 154 and a third dump valve 156 for cooperatively supplying fluid received from the second three-way valve 144 to the left rear wheel brake 102C, and for cooperatively relieving pressurized fluid from the left rear wheel brake 102C to the reservoir conduit 150. A fourth set of valves includes a fourth apply valve 158 and a fourth dump valve 160 for cooperatively supplying fluid received from the second three-way valve 144 to the right front wheel brake 102D, and for cooperatively relieving pressurized fluid from the right front wheel brake 102D to the reservoir conduit 150. Note that in a normal braking event, fluid flows through the de-energized open apply valves 146, 150, 154, 158. Additionally, the dump valves 148, 152, 156, 160 are preferably in their de-energized closed positions during normal braking to prevent unwanted flow of fluid to the reservoir 108.

The brake system 100 also may include normally open first and second single-acting plunger ("SAP") valves 164 and 166, respectively. Each of the first and second SAP valves 164 and 166 is interposed hydraulically between the power transmission unit 106 and a corresponding one of the first and second three-way valves 142 and 144. The first and second SAP valves 164 and 166, when present, each direct fluid from the single-chamber type PTU outlet 126 to a corresponding one of the first and second three-way valves 142 and 144 for assisting with transferring fluid from the reservoir 108 to replenish the power transmission unit 106 during slip control.

The electronic control unit 136 may be a first electronic control unit 136, and the brake system 100 may include a second electronic control unit 136'. In such case, to provide redundancy in the system, a chosen one of the first and second electronic control units 136, 136' controls the master cylinder 128 (i.e., via control of the electric MC motor 130), and the other one of the first and second electronic control units 136, 136' controls at least one of the first and second three-way valves 142, 144, the apply valves 146, 150, 154, 158, the dump valves 148, 152, 156, 160, and the power transmission unit 106 (i.e., via control of the electric PTU motor 112). As a result, the valves of the system may be configured to "fail" (revert to a de-energized state) in such a manner that desired hydraulic fluid flow paths from the master cylinder 128 may be maintained, to provide for the aforementioned backup braking mode in case of failure of one of the electronic control units 136, 136'.

Each of the first and second electronic control units 136, 136' may include microprocessors and other electrical circuitry, and may be connected to either a dedicated or a shared (with the other ECU) power supply. Each of the first and second electronic control units 136, 136' receives various signals, processes signals, and controls the operation of various electrical components of the brake system 100 in response to the received signals. Each of the first and second electronic control units 136, 136' can be connected to various sensors such as the reservoir fluid level sensor 110, brake sensor 140, PTU sensor 124, pressure sensors, travel sensors, switches, wheel speed sensors, and steering angle sensors. Each of the first and second electronic control units 136, 136' may also be connected to an external module (not shown) for receiving information related to yaw rate, lateral acceleration, longitudinal acceleration of the vehicle, or other characteristics of vehicle operation for any reason, such as, but not limited to, controlling the brake system 100' during vehicle braking, stability operation, or other modes of operation. Additionally, each of the first and second electronic control units 136, 136' may be connected to the instrument cluster for collecting and supplying information related to warning indicators such as an ABS warning light, a brake fluid level warning light, and a traction control/ vehicle stability control indicator light. A selected one of the master cylinder 128 and the power transmission unit 106 may be integrated into a common housing with a corresponding one of the first and second electronic control units 136, 136'.

Any of the various electric PTU and MC motors 112 and 130; the first and second three-way valves 142 and 144; the apply valves 146, 150, 154, 158; the dump valves 148, 152, 156, 160; the first and second SAP valves 164, 166; and/or any of the solenoid-controlled components of the brake system 100 may be of a "dual wound" type and/or may have a single wound coil with two separated drive circuits in the brake system 100. As a result, both of the first and second electronic control units 136, 136' are capable of operating such "redundantly configured" valves and motors as desired. Through the redundancy of the electric PTU and MC motors 112 and 130, and on the dual windings of the valves of the brake system 100, either of the first and second electronic control units 136, 136' is capable of controlling the entire brake system 100, should the other ECU be unavailable.

Brake motors (not shown) may be provided for selectively electrically actuating any of the corresponding wheel brakes 102, as desired, in parking and/or service modes. It is contemplated that the wheel brakes 102 could each be powered electrically and/or hydraulically—for example, a selected two of the wheel brakes 102 could be electrically powered and an other two of the wheel brakes 102 could be hydraulically powered, and/or at least one of the wheel brakes 102 could be powered electrically during certain phases of operation and hydraulically during other phases of operation, of the same brake system 100. It is also contemplated that one or more hydraulically and/or electrically powered parking brakes (not shown) could be provided to any of the wheels of the vehicle, as desired.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial"

quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

We claim:

1. A brake system for actuating a plurality of wheel brakes comprising first and second pairs of wheel brakes, the system comprising:

a reservoir;

a motor-driven master cylinder operable during a backup braking mode by actuation of an electric motor of the master cylinder to generate brake actuating pressure at first and second MC outputs to hydraulically actuate the first and second pairs of wheel brakes, respectively;

a power transmission unit configured to selectively provide pressurized hydraulic fluid to a PTU output to actuate the first and second pairs of wheel brakes in a normal non-failure braking mode, the power transmission unit including a side-mounted electric PTU motor configured to selectively pressurize the hydraulic fluid by transmitting rotary motion to a ball nut assembly of the power transmission unit via a force translator mechanically interposed between the electric PTU motor and the ball nut assembly;

an electronic control unit configured to control the power transmission unit and the master cylinder; and first and second two-position three-way valves, each three-way valve being hydraulically connected with the master cylinder, the power transmission unit, and a selected pair of the first and second pairs of wheel brakes;

each of the first and second three-way valves selectively controlling hydraulic fluid flow from a chosen one of the master cylinder and the power transmission unit to the selected pair of wheel brakes.

2. The brake system of claim 1, wherein normal non-failure braking control of each of the wheel brakes is provided by an apply valve and a dump valve hydraulically interposed between a corresponding three-way valve and the wheel brake.

3. The brake system of claim 1, wherein the electronic control unit is a first electronic control unit, and the brake system includes a second electronic control unit, wherein a chosen one of the first and second electronic control units controls the master cylinder, and the other one of the first and second electronic control units controls the first and second three-way valves, and the electric PTU motor of the power transmission unit.

4. The brake system of claim 2, wherein the electronic control unit is a first electronic control unit, and the brake system includes a second electronic control unit, wherein a chosen one of the first and second electronic control units controls the master cylinder, and the other one of the first and second electronic control units controls the first and second three-way valves, the apply valves, the dump valves, and the electric PTU motor of the power transmission unit.

5. The brake system of claim 1, wherein the master cylinder includes an electric MC motor configured to selectively pressurize the hydraulic fluid by transmitting rotary motion directly to a ball nut assembly of the master cylinder.

6. The brake system of claim 1, wherein the master cylinder is a tandem type master cylinder.

7. The brake system of claim 3, wherein a selected one of the master cylinder and the power transmission unit is integrated into a common housing with a corresponding one of the first and second electronic control units.

8. The brake system of claim 1, further comprising a brake pedal connected to a brake pedal unit and selectively actuated by a driver of the vehicle to indicate a desired braking command, the brake pedal unit having a brake sensor configured to determine a position of the brake pedal and responsively producing a braking signal corresponding to the desired braking command, the braking signal being transmitted to the electronic control unit, and the electronic control unit controlling at least one of the power transmission unit and the master cylinder responsive to the braking signal.

9. The brake system of claim 8, wherein the braking signal is wirelessly transmitted to the electronic control unit.

10. The brake system of claim 3, further comprising a brake pedal connected to a brake pedal unit and selectively actuated by a driver of the vehicle to indicate a desired braking command, the brake pedal unit having a brake sensor configured to determine a position of the brake pedal and responsively producing a braking signal corresponding to the desired braking command, the braking signal being transmitted to at least one of the first and second electronic control units, and the at least one of the first and second electronic control units controlling at least a corresponding one of the power transmission unit and the master cylinder responsive to the braking signal.

11. The brake system of claim 1, further comprising first and second normally open SAP valves, each of the first and second normally open SAP valves being interposed hydraulically between the power transmission unit and a corresponding one of the first and second three-way valves.

12. The brake system of claim 1, wherein concurrent disabling of (1) backup braking mode with pressurized hydraulic fluid from the master cylinder, and (2) normal non-failure braking mode with pressurized hydraulic fluid from the power transmission unit is achieved responsive to failure of two or more components of the brake system.

13. The brake system of claim 1, wherein each three-way valve is hydraulically connected with the master cylinder, the power transmission unit, and a selected pair of wheel brakes.

14. The brake system of claim 1, wherein the first and second pairs of wheel brakes are front and rear pairs of wheel brakes.

15. The brake system of claim 1, wherein each of the first and second pairs of wheel brakes includes a front wheel brake from a selected lateral side of the vehicle and a rear wheel brake from an opposite lateral side of the vehicle.

16. The brake system of claim 1, wherein the force translator is a belt drive assembly.

17. The brake system of claim 1, wherein the force translator is at least one of a chain drive assembly and a gear drive assembly.

18. The brake system of claim 1, further comprising a brake pedal unit including a brake pedal, the brake pedal unit being in electronic communication with the electronic control unit, the electronic control unit controlling at least one of the power transmission unit and the master cylinder in response to electronic input from the brake pedal unit.

\* \* \* \* \*